W. S. SHERMAN.
AUTOMATIC RELEASE FOR PRESSER BARS.
APPLICATION FILED AUG. 28, 1916.
1,224,676.
Patented May 1, 1917.
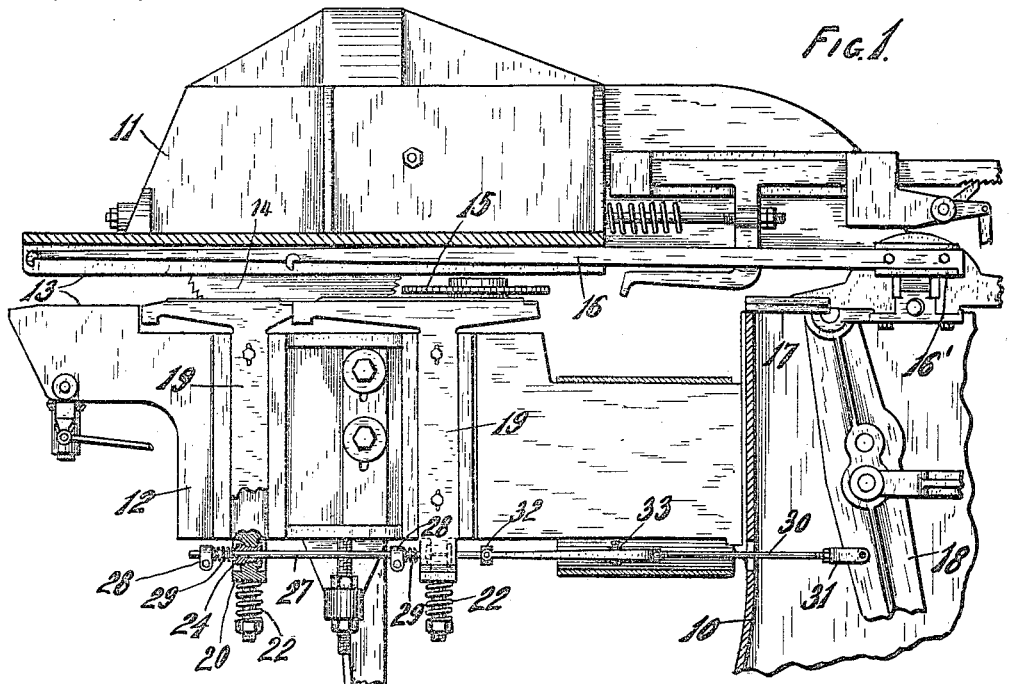
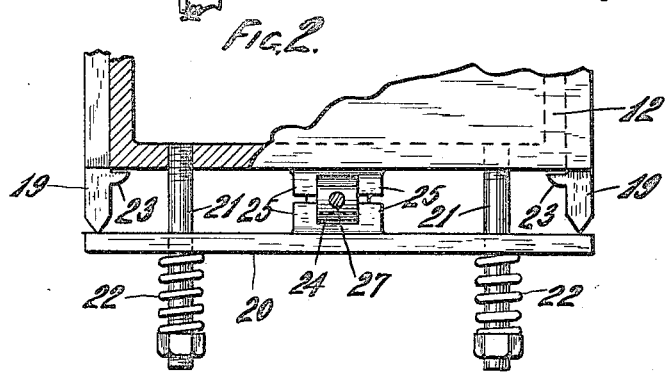
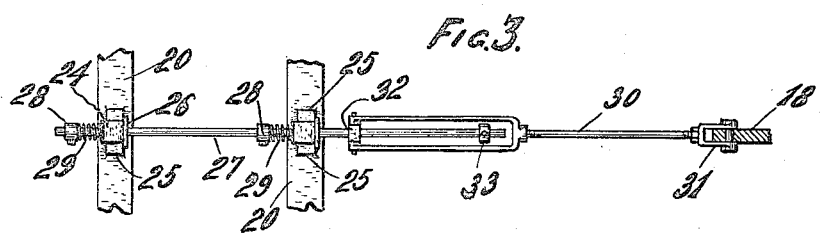
WITNESSES.
INVENTOR.

UNITED STATES PATENT OFFICE.

WILLIS S. SHERMAN, OF MILWAUKEE, WISCONSIN.

AUTOMATIC RELEASE FOR PRESSER-BARS.

1,224,676.

Specification of Letters Patent.

Patented May 1, 1917.

Application filed August 28, 1916. Serial No. 117,130.

*To all whom it may concern:*

Be it known that I, WILLIS S. SHERMAN, a citizen of the United States, and resident of Milwaukee, in the county of Milwaukee and State of Wisconsin, have invented new and useful Improvements in Automatic Releases for Presser-Bars, of which the following is a description, reference being had to the accompanying drawings, which are a part of this specification.

This invention has for its object to provide an end matcher with means for withdrawing pressure from the presser bars just before the work passes off of the presser bars and so prevent the presser bars from crushing the groove in the edge of the work.

With the above and other objects in view the invention consists in the automatic release for presser bars as herein claimed and all equivalents.

Referring to the accompanying drawings, in which like characters of reference indicate the same parts in the different views:

Figure 1 is a front view of a portion of an end matcher showing the automatic release for the presser bars;

Fig. 2 is an end view of the releasing mechanism with the sliding rod sectioned; and, Fig. 3 is a plan view thereof.

In these drawings 10 indicates the frame of the machine having a stationary head block 11 and a work table 12 forming a horizontal work feeding passageway 13 between them. In the path of the work through the work feeding passageway are suitably operated cutters, a cut-off saw 14 serving to first trim the end of the work and a groove cutting saw 15 then cutting the matching groove in such trimmed end. The work is fed through the work feeding passageway by reciprocating hook bars 16 traveling in grooves in the head block and mounted upon a rocking support 16' on a sliding carriage 17 which is reciprocated by an oscillating lever 18. In the portion of the travel of the work where it is subjected to the action of the cutters it is held firmly against the head block by the action of spring pressed pressure bars 19 so that its position or its line of travel will not be affected by the influence of the cutters, and the work performed thereon will therefore be uniform. These presser bars are usually mounted in pairs working in guide grooves on opposite sides of the work table 12, and the presser bars of each pair are given their upward pressure by having their lower ends engage the ends of a spring pressed cross bar 20 which slides on screw studs 21 projecting from the bottom of the work table and is pressed upwardly by coil springs 22 on said studs. Stop lugs 23 projecting from the presser bars 19 engage the bottom of the work table to limit the upward movement of the presser bars and determine the normal distance between the longitudinal upper ends of the presser bars and the head block.

The spring pressure of the presser bars against the work is necessarily great as they have to steady the work by engagement with one end thereof whether the work, usually strips of side matched flooring, is of two feet in length or of sixteen feet in length, and as the strips of flooring are not of uniform thickness the normal distance between the bearing surfaces of the presser bars and the head block is necessarily such that the thinnest strips will be effectively clamped. With the thicker strips of work the presser bars are, therefore, required to yield to a greater extent. The present invention provides automatic means for blocking the presser bars to whatever extent they have been depressed according to the thickness of the work passing over them and thus relieve them of the pressure of the springs so that they will not crush the grooved rear edge of the work as it passes off therefrom, the blocking operation being timed to take effect just before the work leaves the presser bars and before it is liable to such injury.

Wedge blocks 24 rectangular in cross section are interposed between the spring pressed cross bars 20 and the bottom of the work table 12 with their inclined top and bottom faces bearing against corresponding inclined bearing faces of said parts and confined between guide lugs 25 on either side of such bearing faces. Flanges 26 at the smaller ends of the wedge blocks by engaging the guide lugs 25 prevent the withdrawal of the wedge blocks from their positions between the oppositely inclined bearing faces. A rod 27 slidably passes through openings of the wedge blocks and has set collars 28 fixed thereon to form adjustable seats for coil springs 29 surrounding the rod and engaging the larger ends of the wedge blocks. A link 30 with one forked end pivotally mounted at 31 on the lever 18 which reciprocates the work feeding carriage, and the other end forming an elongated yoke pivotally connected at its ends to the opposite trunnions of a collar 32 which is loosely mounted on the rod 27 is adapted to impart motion to the rod 27 at the end of the feeding stroke of the lever 18 by said collar 32 coming into engagement with a set collar 33 adjustably fixed on said rod 27.

During the operation of the machine the collar 32 freely slides on the rod 27 throughout the main portion of the stroke of the work feeding lever 18, and the wedge blocks 24 therefore do not interfere with the usual functioning of the springs 22 in giving the necessary clamping pressure to the presser bars at the time that the cutters are working. Near the end of the work feeding stroke of the lever 18, however, the sliding collar 32 engages the set collar 33 and moves the rod 27 to force the wedge blocks 24 tightly into the crotches between the inclined bearing surfaces of the work table and the cross bars, thus blocking the presser bars against following under spring pressure the yielding of the rear edge of the work as it passes off of the presser bars and avoiding the crushing of the groove walls thereof. The yielding of the springs 29 permits of the blocking operation taking place before the end of the work feeding stroke of the lever 18, enabling the rod 27 to continue its movement after the wedge blocks have become seated. On the beginning of the return stroke of the lever 18 the pressure of springs 29 being removed from the wedge blocks the latter are free to back out of their wedging positions, which they will do under the influence of the pressure springs 22, releasing the presser bars and permitting them to perform their usual functions.

While the machine as shown is provided with two sets of presser bars arranged in pairs, it is obvious that any number may be employed operated singly or in multiples.

What I claim as new and desire to secure by Letters Patent is:

1. A machine for operating upon the ends of strips of lumber or the like, comprising a tool, means for feeding the work to the tool, a clamping guide for the work in its travel to the tool, and means for automatically releasing the pressure of the clamping guide against the work before the work passes off therefrom.

2. A machine for operating upon the ends of strips of lumber or the like, comprising a tool, means for feeding work to the tool, a spring pressed clamping guide for the work in its travel to the tool, and means for automatically relieving the spring pressure of the guide upon the work before the work passes out of engagement therewith.

3. A machine for operating upon the ends of strips of lumber or the like, comprising a tool, means for feeding work to the tool, a spring pressed clamping guide for the work in its travel to the tool, and means for blocking the work guide to relieve the work of the crushing pressure thereof before the work is free therefrom.

4. In an end matcher, a cutter, means for feeding work past the cutter through a work feeding passageway, a presser bar forming a clamping guide for the work in the work feeding passageway, and means operated by the work feeding means for relieving the clamping action of the presser bar before the work passes out of engagement therewith.

5. In an end matcher, a cutter having a work feeding passageway leading thereto, means for feeding work through the work feeding passageway, a presser bar forming a clamping guide for the work in its travel through the work feeding passageway, and a block limiting the movement of the presser bar and operated by the work feeding means while the work is in engagement with the presser bar.

6. In an end matcher, a cutter having a work feeding passageway leading thereto, means for feeding the work through the work feeding passageway, a presser bar mechanism forming a clamping guide for the work in its travel through the work feeding passageway, and a wedge block fitting between the presser bar mechanism and a stationary part for relieving the clamping action against the work while the work is in engagement with the presser bar mechanism.

7. In an end matcher, a stationary head block and a work table forming a work feeding passageway therebetween, means for feeding work through the work feeding passageway, a cutter in the path of the work in its travel through the work feeding passageway, presser bars slidably mounted on the work table, a spring pressed cross bar engaging the presser bars for causing them to engage the work with a clamping action, there being oppositely inclined bearing faces on the cross bar and the work table, a wedge block fitting between said bearing faces, a rod passing through an opening of the wedge block and connected with the work feeding means, a spring seat on the rod, and a spring surrounding the rod and engaging the wedge block.

8. In an end matcher, a stationary head block, a work table forming a work feeding passageway therebetween, means for feeding the work through the work feeding passageway, presser bars slidably mounted on the work table, a cross bar engaging the presser bars, studs on the work table passing through openings in the cross bar, springs on the studs bearing on the cross bar for forcing the presser bars in clamping engagement with the work, there being oppositely inclined bearing faces on the cross bar and the work table, guide lugs at the sides of the inclined bearing faces, a wedge block having inclined faces engaging the inclined bearing faces between the guide lugs, a flange on the smaller end of the wedge block to engage the guide lugs, a rod passing through an opening in the wedge block, an adjustable spring seat on the rod, a coil spring surrounding the rod and engaging the spring seat and the wedge block, and a link connecting the work feeding means with the rod and having a limited loose movement in its connection therewith.

In testimony whereof, I affix my signature, in presence of two witnesses.

WILLIS S. SHERMAN.

Witnesses:
R. S. C. CALDWELL,
KATHARINE HOLT.

Copies of this patent may be obtained for five cents each, by addressing the "Commissioner of Patents, Washington, D. C."